United States Patent [19]

Sturesson

[11] 4,033,427
[45] July 5, 1977

[54] STEERING APPARATUS FOR ROAD ROLLERS

[75] Inventor: Rune Sturesson, Lyckeby, Sweden

[73] Assignee: Dynapac Maskin AB, Solna, Sweden

[22] Filed: Dec. 10, 1975

[21] Appl. No.: 639,282

[52] U.S. Cl. .................................. 180/140; 180/20
[51] Int. Cl.² ........................................... B62D 5/06
[58] Field of Search .............. 180/9.44, 79.3, 79.4, 180/79.5, 20, 9.46, 140, 154, 155, 159, 160, 149, 162; 280/98, 99, 100, DIG. 7, 91

[56] References Cited

UNITED STATES PATENTS

| 2,598,863 | 6/1952 | Tucker | 180/79.4 X |
| 2,839,147 | 6/1958 | Fletcher | 180/20 X |
| 3,669,202 | 6/1972 | Andersen | 180/140 X |
| 3,782,491 | 1/1974 | Herbenar | 180/155 |
| 3,868,194 | 2/1975 | Ferguson | 180/20 X |
| 3,872,942 | 3/1975 | Metailler | 180/20 |

FOREIGN PATENTS OR APPLICATIONS

| 404,834 | 1/1934 | United Kingdom | 180/20 |
| 1,070,789 | 6/1967 | United Kingdom | 180/20 |
| 1,070,455 | 6/1967 | United Kingdom | 180/20 |

Primary Examiner—Robert R. Song
Assistant Examiner—R. Schrecengost
Attorney, Agent, or Firm—Brumbaugh, Graves, Donohue & Raymond

[57] ABSTRACT

Steering apparatus for road rollers of the self-propelled type having two drums each of which is journalled to rotate in a frame pivotally mounted on a common chassis. A piston rod, pivotally connected at its ends to the drum frames, is slidably mounted in a steering cylinder pivotally mounted on the chassis. A control system for transmitting and receiving a pressure medium through a pair of lines connected to the steering cylinder responds to a steering device to cause movement of the piston in the cylinder, so that the piston rod causes simultaneous rotation of the drum frames and proper tracking of the road roller drums.

3 Claims, 3 Drawing Figures

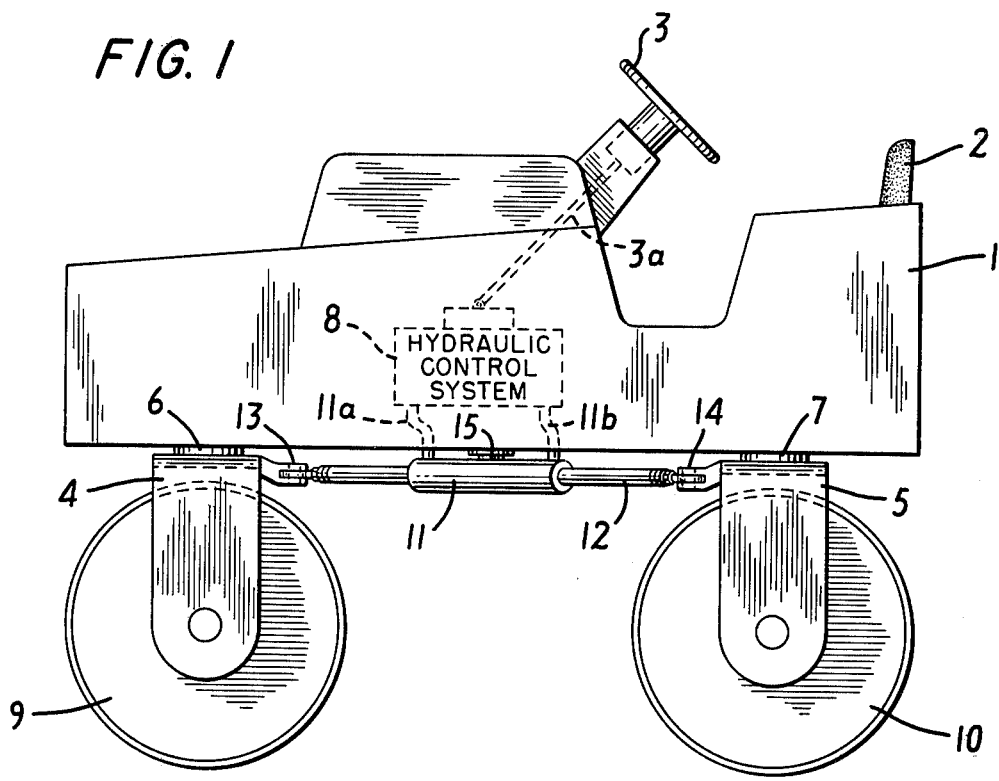
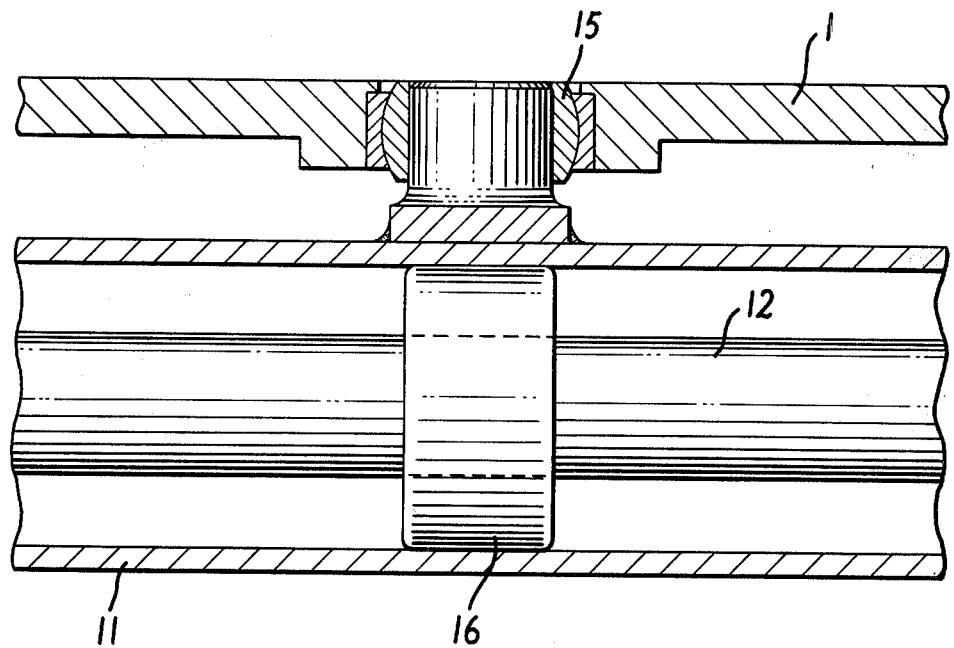

1

STEERING APPARATUS FOR ROAD ROLLERS

BACKGROUND OF THE INVENTION

Self-propelled rollers, in which the front and rear drum frames are connected to each other by means of a center pivot, and which are steered by means of an hydraulically operated steering cylinder, have been previously known. These arrangements allow the drums to track, but they are expensive to manufacture and they occupy much space, so that a longer roller wheel base with a resultant larger turning radius is necessary.

Rollers are also known which have a pair of drum frames, pivoted on a common chassis, which frames are swiveled with the aid of hydraulically operated cylinders connected to each of the frames. The drawbacks of this design, however, are the difficulty of achieving simultaneity in the swiveling motion of the drum frames, and the difficulty of achieving an equal amount of lock or an equal degree of swivel on both drum frames.

On articulated rollers, the center of gravity of the roller moves laterally when the roller changes direction. There is thus a danger of the roller tipping over, particularly when making sharp turns. Furthermore, this danger becomes greater with increased roller speed due to the effect of centrifugal force.

SUMMARY OF THE INVENTION

This invention relates to steering apparatus for self-propelled, two-drum tandem rollers which causes the drums to track perfectly when the roller changes direction. The invention is applicable to road rollers consisting of a front roller and a rear roller, at least one of which is driven, and each of which is journalled to allow rotation in a frame pivoted on a common chassis.

The purpose of this invention thus is to provide a steering device for self-propelled, two-drum tandem rollers, so as to permit the drums to track properly when the roller changes direction. Another object of the invention is to provide a steering device which diminishes the tendency of the roller to tip over as it is turning. A further object of the invention is to provide a steering device which swivels the drum frames simultaneously at the same speed regardless of the direction in which the roller is moving.

DESCRIPTION OF THE DRAWINGS

The invention is described in greater detail below with reference to the appended drawings.

FIG. 1 shows in schematic side view a preferred embodiment of a self-propelled, two-drum tandem roller equipped with a steering cylinder in accordance with the present invention;

FIG. 3 shows a detailed view of the manner in which the steering cylinder is journalled in the roller chassis.

DESCRIPTION OF THE PREFERRED EMBODIMENT

Figure 2:
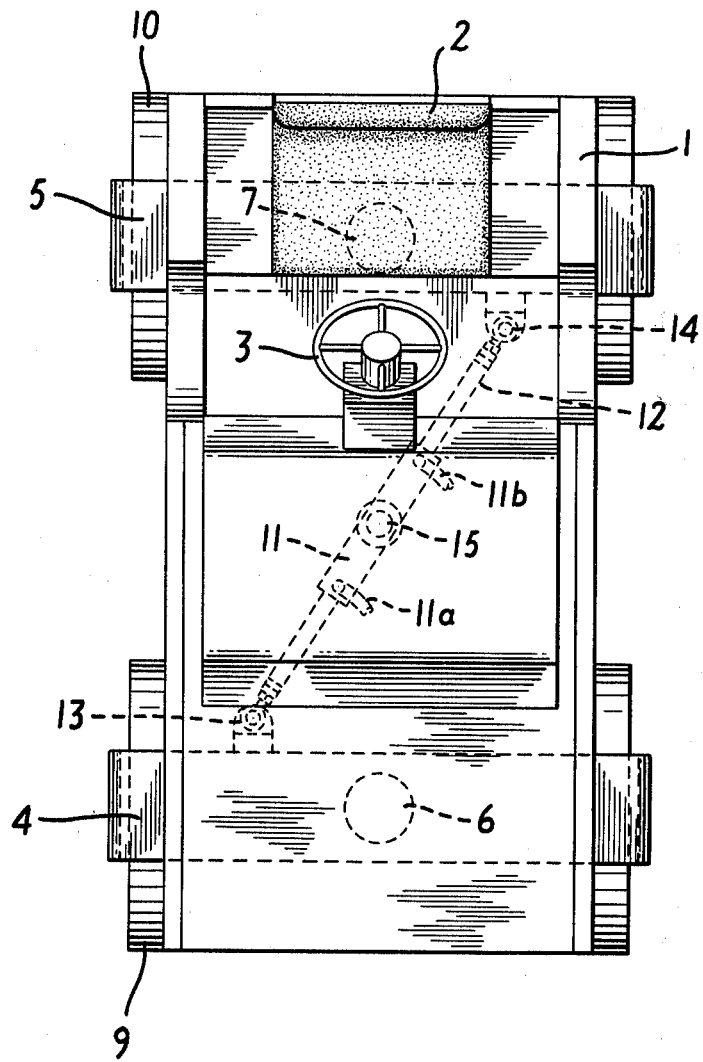
FIG. 2 shows the roller viewed from above.

The roller shown in FIG. 1 consists of a chassis 1 with driver's seat 2 and steering wheel 3. Steering wheel column 3a connects steering wheel 3 with hydraulic control system 8 inside the chassis. It should be noted that a steering wheel and steering wheel column are optional, and could be replaced by portable controls by which an operator, for instance, walking alongside the roller, could direct the hydraulic control system as well as the movement of the roller.

A front drum frame 4 and rear drum frame 5 are swivel mounted to the chassis 1 in bearings 6 and 7, respectively. Drums 9 and 10 are journalled so as to rotate in the drum frames 4 and 5, respectively. The roller may be driven directly by an engine in the roller chassis, or by a motor placed in one or both drums. The drums may also be equipped with eccentric elements for the generation of vibrations, which elements may be driven, for example, with hydraulic motors arranged in the drums.

The roller is steered with the aid of a steering cylinder 11 under the roller chassis 1, mounted via a self-aligning bearing 15 to the roller chassis 1 so that it can pivot omnidirectionally in relation to the center axis of said bearing. The cylinder 11 is slidably fitted at each end about a piston rod 12 which passes through the cylinder, the piston rod 12 being pivotally mounted at one end 13 to the front drum frame 4 at a point laterally spaced from an axis passing through the frame pivots 6 and 7. The rod 12 is connected at its other end 14 to a point on the rear drum frame 5 spaced laterally from the frame pivot axis in the direction opposite to that of the connection point on the frame 4. Connecting lines 11a and 11b lead from said hydraulic control system 8 to opposing ends of the cylinder 11, so as to permit passage of an hydraulic fluid from said hydraulic control system 8 to the interior of cylinder 11. Another suitable pressure medium for the system is compressed air.

FIG. 3 illustrates on a larger scale the interior of the cylinder 11, and the mounting of the cylinder to the chassis 1. Piston 16, integral with the piston rod 12, is slidably positioned within the cylinder 11. The bearing 15 of the steering cylinder must be designed so as to allow the cylinder to be self-aligning in relation to chassis 1. A ball joint constitutes one possible bearing.

A steering operation employing the present invention is begun by an appropriate rotation of the steering wheel 3 and steering wheel column 3a. This rotation is translated by the hydraulic control system 8, by means well known in the art, into the passage of hydraulic fluid into line 11a for a right turn of the roller depicted in FIG. 1, accompanied by movement of the piston 16 and a resulting return of hydraulic fluid into the line 11b from the cylinder. The pressure differential provided across the piston 16 within cylinder 11 by the flow of hydraulic fluid forces piston 16 and piston rod 12 to slide toward the rear of the roller depicted in FIG. 1. This movement of the piston rod, acting through the connections at rod ends 13 and 14, causes simultaneously front drum frame 4 to rotate clockwise when viewed from above, and rear drum frame 5 to rotate counterclockwise when so viewed. Points 13 and 14 describe a circular motion about the bearing points 6 and 7, respectively. The roller thus turns to the right, with the drums tracking perfectly. It continues around in this manner until steering wheel 3 is returned to its original position; this causes hydraulic control system 8 to increase the hydraulic pressure on the pressure medium passing through line 11b with respect to that in line 11a, so that piston 16 is forced back toward the center of cylinder 11. For a turn to the left, the hydraulic control system 8 is simply caused to increase the pressure on the pressure medium in the line 11b, and to decrease the hydraulic pressure in line 11a, so that piston 16 is forced toward the front of the roller as depicted in FIG. 1. The drum frames 4 and 5 are thus each rotated in a direction opposite to the direction described above for a right turn.

By means of this invention, a steering device is provided for a two-drum, tandem roller which insures perfect tracking of the drums, and, consequently, gives the roller more effective compaction capability. Furthermore, the center of gravity of the roller will always be in the vertical plane through the symmetrical center of the drums, even when the roller changes direction, with a resulting substantial increase in the stability of the roller.

I claim:

1. In a self-propelled roller having a chassis, two drums at least one of which is driven and each of which is journalled so as to rotate in a frame mounted pivotally on the chassis, and an actuatable steering device for selecting the direction of travel of the moving roller, the improvement comprising a steering cylinder and a piston slidably mounted in the cylinder, a piston rod pivotally connected at one end to one of the drum frames at a point laterally spaced in one direction from an axis passing through the frame pivots, the rod being pivotally connected at its other end to the other of the drum frames at a point laterally spaced in the opposite direction from the frame pivot axis, the piston rod being connected to the piston and passing through said steering cylinder, bearing means pivotally mounting the steering cylinder to the chassis, a control system for transmitting and receiving a pressure medium through a pair of lines, said lines being connected to the cylinder and conveying the pressure medium to opposite sides of the piston, the control system being responsive to actuation of the steering device to supply the pressure medium selectively through said lines to the steering cylinder to cause movement of the piston in the cylinder whereby the piston rod causes simultaneous rotation of the drum frames and proper tracking of the drums.

2. A self-propelled roller as defined in claim 1, wherein said bearing means is a self-aligning bearing.

3. A self-propelled roller as defined in claim 2, wherein the self-aligning bearing is a ball joint.

* * * * *